(12) United States Patent
Tanner

(10) Patent No.: US 10,033,922 B1
(45) Date of Patent: Jul. 24, 2018

(54) STITCHING FOR A MULTIPLE IMAGER VIDEO SYSTEM BASED ON A NON-LINEAR SEAM

(71) Applicant: Altia Systems, Inc., Cupertino, CA (US)

(72) Inventor: Jason Daniel Tanner, Folsom, CA (US)

(73) Assignee: Altia Systems, Inc., Cupertino, CA (US)

( * ) Notice: Subject to any disclaimer, the term of this patent is extended or adjusted under 35 U.S.C. 154(b) by 954 days.

(21) Appl. No.: 13/902,248

(22) Filed: May 24, 2013

Related U.S. Application Data

(60) Provisional application No. 61/652,060, filed on May 25, 2012.

(51) Int. Cl.
*H04N 5/232* (2006.01)
(52) U.S. Cl.
CPC .............................. *H04N 5/23238* (2013.01)
(58) Field of Classification Search
CPC ............. H04N 5/23238; H04N 5/2628; H04N 5/2259; G06T 3/4038; G02B 13/06
USPC .......................................................... 348/36
See application file for complete search history.

(56) References Cited

U.S. PATENT DOCUMENTS

| | | | | |
|---|---|---|---|---|
| 2007/0177667 A1* | 8/2007 | Subramania | ....... | H04N 21/6131 375/240.12 |
| 2007/0237420 A1* | 10/2007 | Steedly | .................... | G06K 9/32 382/284 |
| 2008/0219351 A1* | 9/2008 | Kim | ................. | H04N 19/00569 375/240.16 |
| 2010/0194851 A1* | 8/2010 | Pasupaleti | ............ | H04N 1/3876 348/36 |
| 2011/0096136 A1* | 4/2011 | Liu | ........................ | H04N 7/144 348/14.07 |

\* cited by examiner

*Primary Examiner* — Christopher S Kelley
*Assistant Examiner* — Matthew Kwan
(74) *Attorney, Agent, or Firm* — HM Law Group LLP; Vani Moodley, Esq.

(57) ABSTRACT

In one embodiment, there is provided a method for stitching left images P from a first imager with right images Q from a second imager thereby to produce stitched video images, the method comprising: for each current frame N: calculating a spatial distortion Spatial(i,j) for each pixel in a region of overlap between an image PN corresponding to the frame N and an image $Q_N$ corresponding to the frame N; calculating a temporal distortion Temporal(i,j) for each pixel in said region of overlap; determining a minimal cost path for traversing the region of overlap from top to bottom, wherein said minimal cost path comprises a pixel from each row in said region of overlap; and setting said minimal cost path as a seam for stitching images $P_N$ and $Q_N$ together to form a composite image $C_N$.

20 Claims, 4 Drawing Sheets

STITCHING FOR A MULTIPLE IMAGER VIDEO SYSTEM BASED ON A NON-LINEAR SEAM

This application claims the benefit of priority to U.S. Provisional Patent Application No. 61/652,060, which was filed on May 25 2012, the entire specification of which is incorporated herein by reference.

FIELD

Embodiments of the invention relate generally to multiple imager video systems that produce panoramic images through a process of stitching multiple images together.

BACKGROUND

Multiple imager video systems can make multiple images appear to be from a single input source through a process of stitching or blending images into a single video stream.

FIG. 1 illustrates the process of stitching together two images 100 and 102. It is to be noted that the same process applies to the case of stitching more than two images. Referring to FIG. 1, it will be seen that the image 100 includes a region of overlap 104, whereas the image 102 includes a region of overlap 108.

Solid lines 106 and 110 define merge lines. The significance of the merge lines 106 and 110 is that they demarcate redundant information on the images 100 and 102 that is to be removed during merging/stitching. Thus, for the image 100 on the left, the dotted information right of the merge line 106 (and similarly for the image 102 on the right, the dotted information left of the merge line 110) will be removed since it is redundant information. Thus, each merge line 106, 110 defines a location of the seam between the images 100 and 102. During normal operation, the seam location is retrieved from memory and used to stitch a sequence of images. The seam location is a static location identified during manufacturing.

The ideal multiple imager video system should leave a viewer unaware that multiple imagers recorded the video. Thus, the viewer has a seamless experience in which the multiple imagers appear as a single imager.

SUMMARY

This Summary is provided to comply with 37 C.F.R. § 1.73, requiring a summary of the invention briefly indicating the nature and substance of the invention. It is submitted with the understanding that it will not be used to interpret or limit the scope or meaning of the claims.

In one aspect, there is provided a method for stitching left images P from a first imager with right images Q from a second imager thereby to produce stitched video images, the method comprising: for each current frame N: calculating a spatial distortion Spatial(i,j) for each pixel in a region of overlap between an image PN corresponding to the frame N and an image $Q_N$ corresponding to the frame N; calculating a temporal distortion Temporal(i,j) for each pixel in said region of overlap; determining a minimal cost path for traversing the region of overlap from top to bottom, wherein said minimal cost path comprises a pixel from each row in said region of overlap; and setting said minimal cost path as a seam for stitching images $P_N$ and $Q_N$ together to form a composite image $C_N$.

Other aspects of the invention will be apparent from the detailed description below.

BRIEF DESCRIPTION OF THE DRAWINGS

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

The present invention, in accordance with one or more various embodiments, is described in detail with reference to the following figures. The drawings are provided for purposes of illustration only and merely depict exemplary embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Figure 1:
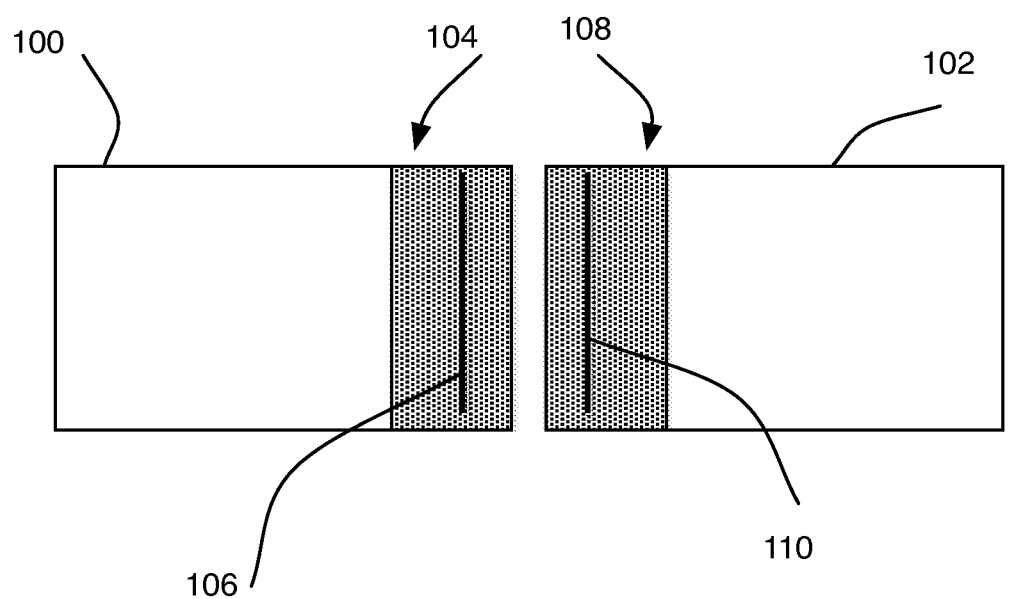
FIG. 1 illustrates the process of stitching together two images.
Figure 2:
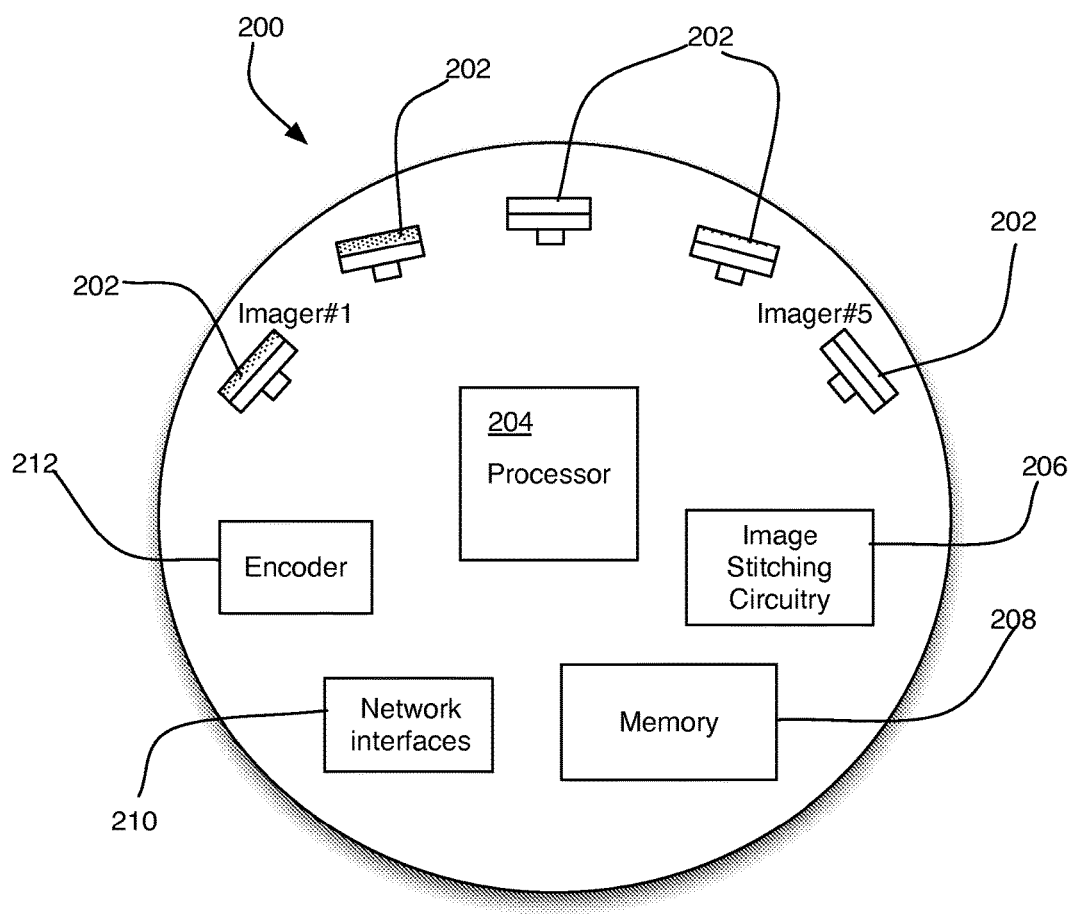
FIG. 2 illustrates an example embodiment of an apparatus configured for generating panoramic images according to one embodiment of the invention.

FIG. 2 illustrates an example embodiment of an apparatus configured for generating panoramic images according to one embodiment of the invention, in the form of multiple imager video system (camera) 200.

The system 200 includes multiple imagers/sensors 202 mounted along an arc such that each imager 202 is directed to capture a portion of a scene. Each imager 202 may include suitable sensors, for example charge-coupled device (CCD) or complimentary metal-oxide semiconductor (CMOS) imaging sensors, as is known in the art.

The system 200 also includes logic/processor 204, image stitching circuitry 206, memory 208, one or more network interfaces 210, and an encoder 212 In one embodiment, digital signals recorded by sensors 202 are sent to the logic/processor 204 for processing. In one embodiment, the logic/processor 204 may execute programs for implementing image processing functions and calibration functions, as well as for controlling the operation of the entire device 200 including its image capture operations. Optionally, the logic/processor 204 may include signal processing functionality for performing image processing, including image filtering, enhancement and for combining multiple fields of view in cooperation with the image stitching circuitry 206, as will be explained in greater detail below Although shown separately, in some embodiments, the image stitching circuitry 206 may exist as part of the logic/processor 204. It is to be understood that components of the device 200 may take the form of hardware, software, firmware, or any combination of hardware, software, and firmware.

Digital signals representing a panoramic view may be stored in memory 208. The encoder 212 may compress digital signal before transmission across via a network interface 210. The network interfaces 210 may be configured to provide network connectivity to the device 200. As such, the network interfaces 210 may include wireless and wired interfaces, in accordance with different embodiments.

Each image sensor 202 captures a different portion of a scene to be imaged. When stitching to together images from the imagers 202 it is important for objects across a seam align properly with at least minimal artifacts.

Embodiments of the present invention disclose techniques for stitching together two images based on a non-linear seam thereby to produce a stitched image. In one embodiment, the non-linear seam represents the path of least energy in a region of overlap between the two images. Thus, temporal and spatial distortions along the non-linear seam are at least reduced. The techniques may be implemented by the image stitching circuitry 206.

Advantageously, the techniques at least reduce visual artifacts in a stitched image due to different nodal points between imagers, lens distortion, and differences in rotation between imagers.

Figure 3:
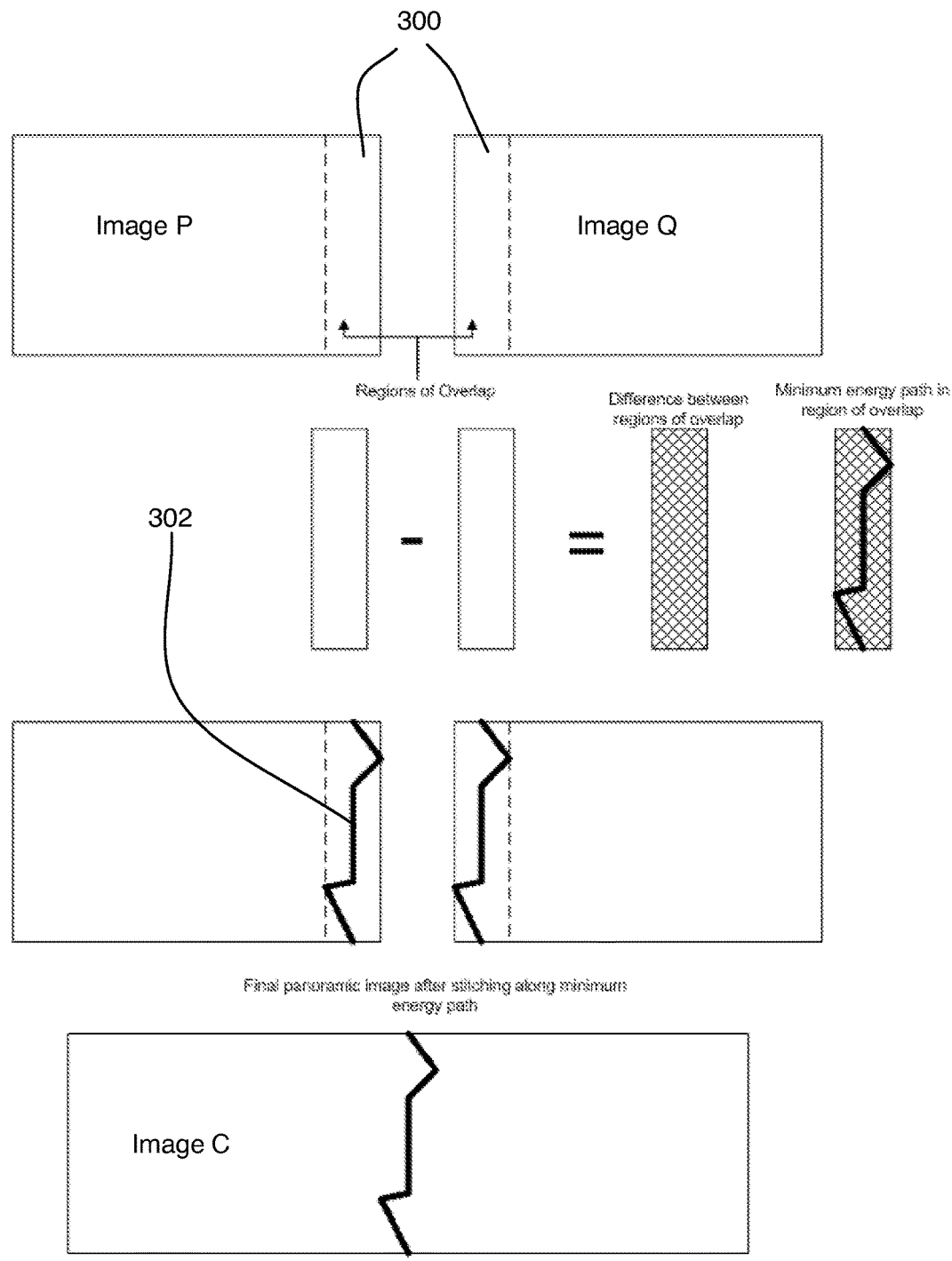
FIG. 3 a technique for stitching together two images to form a stitched image using a non-linear seam, in accordance with one embodiment of the invention.

FIG. 3 illustrates the technique for stitching together two images P and Q to produce a stitched image C using a non-linear seam 302.

Figure 4:
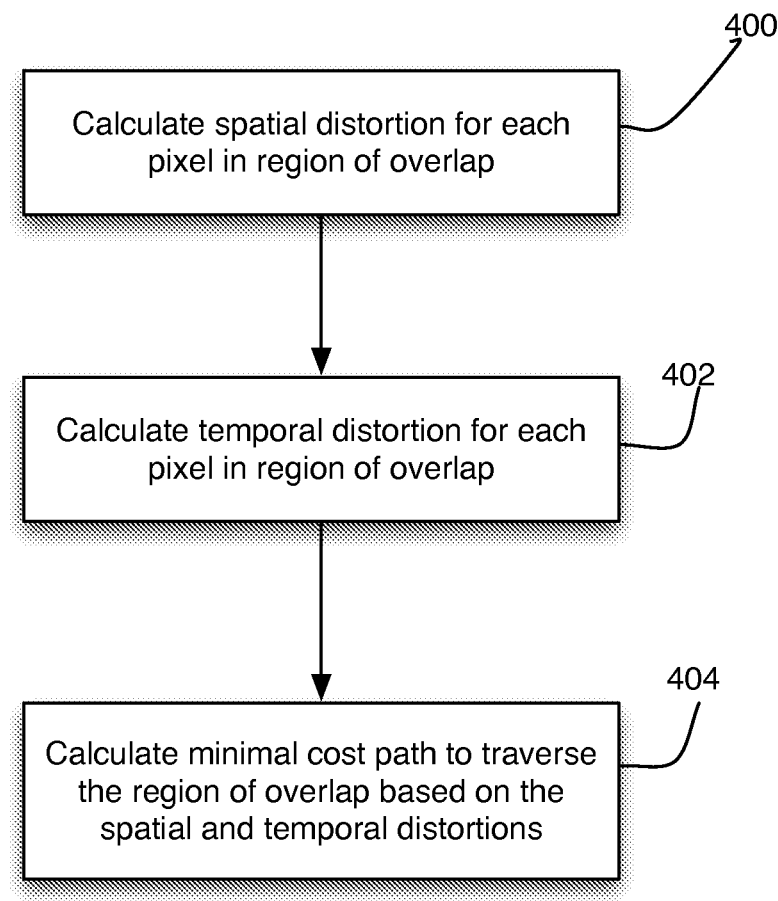
FIG. 4 the processing blocks for a stitching technique that uses a non-linear seam, in accordance with one embodiment of the invention.

FIG. 4 shows the processing blocks to produce the stitched images C, in accordance with one embodiment of the invention. Referring FIG. 4, at block 400 a spatial distortion is calculated for each pixel in a region of overlap 300 (see FIG. 3) between the two images P and Q.

For descriptive convenience, coordinate system (i,j) references collocated pixels in the region of overlap 300.

In one embodiment, the spatial distortion is calculated based on the following equation:

$$\text{Spatial}(i,j) = P_N(i,j) - Q_N(i,j)$$

In one embodiment, when calculating pixel values between the seams may be corrected for luminance and chrominance differences as is described in co-pending U.S. patent application Ser. No. 13/902,136, which is incorporated herein by reference, in its entirety.

At block 402, a temporal distortion is computed for each pixel in the region of overlap 300 using the following equations:

$$P_{Temporal}(i,j) = |P_N(i,j) - P_{N-1}(i,j)|$$

$$Q_{Temporal}(i,j) = |Q_N(i,j) - Q_{N-1}(i,j)|$$

$$\text{Temporal}(i,j) = P_{Temporal}(i,j) + Q_{Temporal}(i,j)$$

At block 404, the per-pixel spatial and temporal distortions may be used to compute the minimal cost function/path Cost(i,j) to minimize the overall distortion (spatial and temporal). The path may traverse through different columns to arrive at the minimal cost path. In one embodiment, to calculate the path, each column calculates a distortion. Each column processes row by row to select a neighboring pixel from the proceeding row (i−1) that has the minimal distortion as indicated by the equation below:

$$\text{Cost}(i, j) = \text{Dist}(i, j) + \min \begin{pmatrix} \text{Cost}(i-1, j-1) \\ \text{Cost}(i-1, j) \\ \text{Cost}(i-1, j+1) \end{pmatrix}$$

Starting with the first row, each distortion (spatial and temporal) is calculated for each pixel in the first row. Then, for the second row (and each subsequent row), a distortion is calculated for each pixel in that row and added to a minimum cost distortion of one of the pixels of the preceding row. In one embodiment, the distortion is accumulated in Cost(i,j) through all rows until the end of the region of overlap 300 is reached. The path (i) with the minimum Cost(i,j) at j=region of overlap height (there will be N paths where N is equivalent to the width of the region of overlap) will be selected for that frame. Each frame will get a new path and can be different frame to frame. The path will traverse the region of overlap and have one pixel location per row and can span across any of the columns in the region of overlap. In FIG. 3, reference numeral 302 indicates the path(i) with the minimum Cost(i,j) used to stitch images P and Q together to produce the stitched image C.

In one embodiment, in addition to the distortions mentioned above, a composite distortion may be calculated relative to the composite of the previous frame. As indicated in FIG. 3, the composite C is the combination of image P and image Q. While image P and image Q change, the end user only sees what is in the composite C. So if the scene is static and the path through the composite C changes from one frame to another there may be noticeable artifacts. In one embodiment, Composite(i,j) computes the difference between the C of frame N−1 and P or Q depending on the location of the seam(j) of the prior frame for each row j. Composite(i,j) represents the change that would be seen by switching the seam to show image P instead of Q or vice versa depending on the location relative to the prior seam. In one embodiment, Composite(i,j) may be computed based on the following equation:

$$\text{Composite}(i, j) = \sum_{\text{seam}(j)}^{i} |Q_N(i, j) - C_{N-1}(i, j)| f(P_{Temporal}(i, j)) \quad i < \text{seam}(j)$$

$$\sum_{i}^{\text{seam}(j)} |P_N(i, j) - C_{N-1}(i, j)| f(Q_{Temporal}(i, j)) \quad i > \text{seam}(j)$$

In one embodiment, differences with the composite C that do not show a temporal difference (in one embodiment, temporal is used for the weighting so if there was a change, the cost decreases, but if no change it costs more to make changes as it would be more likely to be seen by the end user) are avoided by weighting against changes in the absence of temporal changes.

In one embodiment, the final cost for the Dist(i,j) includes the weighted distortions for Spatial, Temporal, and Composite and is given by the equation below:

$$\text{Dist}(i,j) = \alpha * \text{Spatial}(i,j) + \beta * \text{Temporal}(i,j) + \delta * \text{Composite}(i,j)$$

It is to be understood that embodiments of the present invention are not limited to the particular method of calculating the spatial distortion described above with reference to bloc 300 of FIG. 3. Thus, other methods for calculating the spatial distortion may be used. These include edge detection of surfaces and subsequent calculation of pixel differences at the edges, frequency domain transformation and subsequent comparison of the magnitude of high frequency coefficients.

Likewise, it is to be understood that embodiments of the present invention are not limited to the particular method of calculating the temporal distortion described above with reference to block 302 of FIG. 4. Other methods for calculating the temporal distortion may include calculating the difference between images P (or Q) over a larger window to obtain the median or average difference between each frame, or the maximum difference between each frame, or the number of times it changes above a certain threshold. In some embodiment, the frames may be sub-sampled at a random interval and some of the above methods for calculating the temporal distortion may be applied. In one embodiment, calculating the temporal distortion may include sub-sampling the frames and calculating the median pixel value over the region of overlap and then checking the amount of times it deviates above a certain threshold. Summation of motion vectors in a region or summation of motion vectors that would likely point into the future area.

In one embodiment, motion into or out of a seam may be useful to bias the system early. For instance if someone is walking toward a seam, the system can adjust to locate the seam further from the individual and then transition back after the person has passed the seam. The foregoing adjustment ensures that there is no disruption in how the individual appears. Multiple imager video systems also encode video and thus have motion estimation. In one embodiment, the motion estimation in the scene may be used to guide the dynamic seam location at a minimal temporal distortion.

Numerous specific details may be set forth herein to provide a thorough understanding of a number of possible embodiments of a digital imaging system incorporating the present disclosure. It will be understood by those skilled in the art, however, that the embodiments may be practiced without these specific details. In other instances, well-known methods, procedures, components and circuits have not been described in detail so as not to obscure the embodiments. It can be appreciated that the specific structural and functional details disclosed herein may be representative and do not necessarily limit the scope of the embodiments.

The method of the present invention may be performed either in hardware, software, or any combination thereof, as those terms are currently known in the art. In particular, the present method may be carried out by software, firmware, or microcode operating on a computer or computers of any type, including preexisting or already-installed image processing facilities capable of supporting any or all of the processor's functions. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among devices connected to the Internet. Accordingly, the present invention is not limited to any particular platform, unless specifically stated otherwise in the present disclosure.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for stitching left images P from a first imager with right images Q from a second imager thereby to produce stitched video images, the method comprising:

for each current frame N:
calculating a spatial distortion Spatial(i,j) for each pixel in a region of overlap between an image $P_N$ corresponding to the frame N and an image $Q_N$ corresponding to the frame N, wherein the spatial distortion is calculated based on luminance and chrominance value for each pixel in the region of overlap;
calculating a temporal distortion Temporal(i,j) for each pixel in said region of overlap by sub-sampling the frame and calculating a median pixel value over the region of overlap and then checking a number of times it deviates above a threshold level;
determining a minimal cost path for traversing the region of overlap from top to bottom, wherein said minimal cost path comprises a pixel from each row in said region of overlap; and
setting said minimal cost path as a seam for stitching images $P_N$ and $Q_N$ together to form a composite image $C_N$.

2. The method of claim 1, wherein the minimal cost path is non-linear.

3. The method of claim 2, further comprising calculating a composite distortion Composite(i,j) for each pixel (i,j) in a region of overlap between a composite image $C_{N-1}$ corresponding to a prior frame N−1 and one of images P and Q corresponding to the frame N based on a location of a seam used for stitching images P and Q of said frame N for each row j.

4. The method of claim 3, wherein the composite distortion is calculated relative to pixels corresponding to image P the prior frame N−1 for each pixel (i,j) where i is greater than the location of the seam.

5. The method of claim 3, wherein the composite distortion is calculated relative to pixels corresponding to image Q of the prior frame N−1 for each pixel (i,j) where i is less than the location of the seam.

6. The method of claim 3, wherein determining the minimal cost path is based on minimizing said spatial, temporal, and composite distortions calculated for pixels in the region of overlap.

7. The method of claim 3, wherein determining the minimal cost path is based on a weighted sum of the spatial, temporal, and composite distortions.

8. A system, comprising: a processor; and
a memory coupled to the processor, the memory storing instructions which when executed by the processor causes the system to perform a method for stitching left images P from a first imager with right images Q from a second imager thereby to produce stitched video images, the method comprising:

for each current frame N:
calculating a spatial distortion Spatial(i,j) for each pixel in a region of overlap between an image $P_N$ corresponding to the frame N and an image $Q_N$ corresponding to the frame N, wherein the spatial distortion is calculated based on luminance and chrominance value for each pixel in the region of overlap;
calculating a temporal distortion Temporal(i,j) for each pixel in said region of overlap by sub-sampling the frame and calculating a median pixel value over the region of overlap and then checking a number of times it deviates above a threshold level;
determining a minimal cost path for traversing the region of overlap from top to bottom, wherein said minimal cost path comprises a pixel from each row in said region of overlap; and
setting said minimal cost path as a seam for stitching images $P_N$ and $Q_N$ together to form a composite image $C_N$.

9. The system of claim 8, wherein the minimal cost path is non-linear.

10. The system of claim 9, wherein the method further comprises calculating a composite distortion Composite(i,j) for each pixel (i,j) in a region of overlap between a composite image $C_{N-1}$ corresponding to a prior frame N−1 and one of images P and Q corresponding to the frame N based on a location of a seam used for stitching images P and Q of said frame N for each row j.

11. The system of claim 10, wherein the composite distortion is calculated relative to pixels corresponding to image P of the prior frame N−1 for each pixel (i,j) where i is greater than the location of the seam.

12. The system of claim 10, wherein the composite distortion is calculated relative to pixels corresponding to image Q of the prior frame N−1 for each pixel (i,j) where i is less than the location of the seam.

13. The system of claim 10, wherein determining the minimal cost path is based on minimizing said spatial, temporal, and composite distortions calculated for pixels in the region of overlap.

14. The system of claim 10, wherein determining the minimal cost path is based on a weighted sum of the spatial, temporal, and composite distortions.

15. A non-transitory computer-readable medium having stored thereon a sequence of instructions which when executed by a system causes the system to perform a method for stitching left images P from a first imager with right images Q from a second imager thereby to produce stitched video images, the method comprising:

for each current frame N:
calculating a spatial distortion Spatial(i,j) for each pixel in a region of overlap between an image $P_N$ corresponding to the frame N and an image $Q_N$ corresponding to the frame N, wherein the spatial distortion is calculated based on luminance and chrominance value for each pixel in the region of overlap;
calculating a temporal distortion Temporal(i,j) for each pixel in said region of overlap by sub-sampling the frame and calculating a median pixel value over the region of overlap and then checking a number of times it deviates above a threshold level;

determining a minimal cost path for traversing the region of overlap from top to bottom, wherein said minimal cost path comprises a pixel from each row in said region of overlap; and setting said minimal cost path as a seam for stitching images $P_N$ and $Q_N$ together to form a composite image $C_N$.

16. The computer-readable medium of claim 15, wherein the minimal cost path is non-linear.

17. The computer-readable medium of claim 16, wherein the method further comprises calculating a composite distortion Composite(i,j) for each pixel (i,j) in a region of overlap between a composite image $C_{N-1}$ corresponding to a prior frame N−1 and one of images P and Q corresponding to the frame N based on a location of a seam used for stitching images P and Q of said frame N for each row j.

18. The computer-readable medium of claim 17, wherein the composite distortion is calculated relative to pixels corresponding to image P of the prior frame N−1 for each pixel (i,j) where i is greater than the location of the seam.

19. The computer-readable medium of claim 17, wherein the composite distortion is calculated relative to pixels corresponding to image Q of the prior frame N−1 for each pixel (i,j) where i is less than the location of the seam.

20. The computer-readable medium of claim 17, wherein determining the minimal cost path is based on minimizing said spatial, temporal, and composite distortions calculated for pixels in the region of overlap.

* * * * *